ated Nov. 4, 1958

2,859,206

THIOUREA AND UREA-FORMALDEHYDE MIXED RESINS

Raymond Polansky and William Frank Herbes, Somerville, N. J., assignors to American Cyanamid Company, New York, N. Y., a corporation of Maine No Drawing. Application July 11, 1956
Serial No. 597,088

12 Claims. (Cl. 260—70)

The present invention relates to water-soluble hydrophilic mixed resins of thiourea and urea and more particularly to mixed thiourea and urea-formaldehyde condensates that are partially alkylated and to the process for making the same.

While mixed thiourea and urea resins have been prepared heretofore, a particular difficulty with resins of this class has been their notable lack of stability. In overcoming this difficulty, these resins, either separately or together, have been modified by stabilizing agents and the like to achieve maximum mechanical stability. In many instances, the resulting stability has been a temporary condition and after relatively short periods of storage, turbidity has resulted.

As a result, it has been customary to prepare the water-soluble varieties of these resins immediately prior to their use. This has, of course, limited their utility greatly, since many potential users lack the skill and equipment for the manufacture of these resins. While numerous water-insoluble or hydrophobic condensates have been prepared, stable hydrophilic or water-dilutable resins of relatively low formaldehyde content and low urea-formaldehyde content are not known.

Therefore, it is an object of the present invention to provide a stable, water-soluble hydrophilic mixed thiourea-urea-formaldehyde resin, the respective thiourea and urea components of which are partially alkylated and preferably partially methylated.

It is a further object to provide a process for the manufacture of such resins.

It is a still further object to provide a process for treating textile fabrics and in particular nylon netting with said resin, whereby good flame resistance is imparted thereto.

A still further object is to provide a resin which may be readily mixed with other aminoplast resins and other stiffening agents to impart, when applied to textile fabric and in particular to nylon netting, a stiff, springy hand and good flame resistance.

It is still a further and more specific object to provide a stable water-soluble hydrophilic thiourea-urea-formaldehyde mixed resin in which the individual components are partially alkylated and in which the urea is present in relatively small amounts, when compared to the thiourea component of the resin mixture.

These and other objects and advantages will become apparent from the detailed description set forth hereinbelow.

According to the present invention, a process is provided for preparing a water-soluble hydrophilic essentially monomeric potentially thermosetting resinous product which comprises reacting at a temperature between 45° C. and 65° C. and at a pH between 7 and 10 relative proportions of 1 mole of thiourea with from between 1.0 and 2.2 moles of formaldehyde in the presence of between 1.0 and 5.0 moles of a saturated monohydric aliphatic alcohol containing from 1 to 3 carbon atoms.

Thereafter, the pH of the reaction mixture is adjusted to from between 5.1 and 6 and the reaction is continued to alkylate the thiourea-formaldehyde condensate. Thereafter, from between 0.05 and 0.38 mole of urea is added to said reaction mixture and the reaction is continued until urea has reacted with excess formaldehyde present in the reaction mixture and has become partially alkylated. The pH is then adjusted back to the alkaline side to between 7 and about 9 to prevent further reaction and to stabilize the resinous product. According to the present invention, a stable hydrophilic water-soluble resin is defined as one which does not become turbid or cloudy or does not shed down floc when stored for at least four weeks at 25° C. and a resin which does not hydrophobe or develop permanent turbidity when diluted with 3 times its volume of water at 25° C.

Best results are obtained during the methylolation of thiourea at a temperature between 50 and 55° C. and a pH of 7.5 and 9.0 when the formaldehyde to thiourea mole ratio is from between 1.2 and 1.6 to 1. While aldehydes other than formaldehyde may be employed in the alkylolation reaction, as for example, water-soluble aldehydes, such as acetaldehyde, propionaldehyde, glyoxol and the like, formaldehyde is greatly preferred for purposes of the present invention, either as a formalin solution or in its more concentrated form, such as paraformaldehyde. For the most part, formaldehyde as paraformaldehyde is preferred in that in its concentrated form the water content of the reaction system is reduced, which enables larger quantities of the final resin product to be prepared with greater facility.

While the saturated aliphatic monohydric alcohol may be added initially and be present in the reaction system at the time of the methylolation of the thiourea, it is not necessarily so, it being noted that it may be added in the reaction mixture subsequent to the methylolation. Among the suitable alcohols which may be employed are methanol, ethanol, propanol, and isopropanol, as well as mixtures of two or more of these alcohols. Higher saturated aliphatic alcohols, generally speaking, are unsatisfactory in that they decrease the hydrophilic characteristics of the resins of the present invention. Methanol is preferred for use in that the hydrophilic characteristics of the resin are best preserved and, in addition, it is relatively inexpensive and readily available. Whether the alcohol is added intially, i. e. at the time of the methylolation of the thiourea, or during the alkylation portion of the present preferred process, or in each, it is employed in amounts of from between 1.0 and 5.0 moles and preferably from between 1.0 and 2.5 moles per mole of thiourea and urea.

Methylolation is achieved in most instances in from between 1 and 3 hours and preferably from between 1½ to 2½ hours reaction time. Lesser periods of time under-react the product and the necessary degree of methylolation of the thiourea is not achieved. If the reaction time significantly exceeds a 3-hour period under the conditions of temperature and pH stated, partial degradation and possibly some undesirable polymerization of the product is produced.

After methylolation of the thiourea, the pH of the reaction mixture is adjusted to from between 5.1 and 6 and preferably to from between 5.3 and 5.7 with a suitable acid or acid-acting material. Suitable acids include oxalic, formic, tartaric, hydrochloric, sulfuric, phosphoric, and the like or mixtures of these. While it is possible to go somewhat lower than 5.1 and under certain conditions produce a relatively stable and therefore partially acceptable product, an end resinous product which is stable both under refrigerated conditions and under slightly elevated conditions of temperature cannot be produced, particularly when in the highly concentrated form, employing the conditions and mole ratios of the present process. Thus, for example, alkylation at values as low as 4.5 have resulted in mixed resins, which, when concentrated to resin solids of 80 to 90% will become turbid in a relatively short period of time when stored, for example, at 12° C. and 37° C., but when diluted to a 45 to 55% resin solids would remain relatively clear at these temperatures. Since it is important commercially to produce a resin which is stable under reasonably forseeable temperature conditions and in concentrated form, a resin not meeting these specifications would have only limited utility.

When the pH of the reaction mixture has been adjusted to the acid side, the temperature conditions are maintained substantially the same as during methylolation, that is, a range of from between about 45 to about 65° C., and preferably to from between about 50 and 55° C. is maintained. During this time, which normally extends for a period of about ½ to 1½ hours, the thiourea-formaldehyde condensate is alkylated. Preferably, the reaction time is from between about ¾ of an hour to about 1¼ hour. Thereafter, while maintaining the same conditions of pH and temperature, from between 0.05 and 0.38 and preferably from between 0.1 and 0.30 mole of urea are added to the reaction mixture and reaction conditions are maintained for an additional period of time of from ½ to 1½ hours and preferably from ¾ to 1¼ hours. During this time, the urea is reacting with free or uncombined formaldehyde in the reaction mixture and, in addition, is at least partially alkylated.

While it is preferred that the urea be added after the alkylation of the thiourea-formaldehyde condensate, it may be added prior to the alkylation of said condensate. When added prior to alkylation, the urea appears to be preferentially alkylated in that it tends to react after being methylolated with the alcohol present in the reaction system before the methylolated thiourea. This is generally undesirable in that the alkylation of the thiourea is more important to the stability in the final product than is the alkylated urea-formaldehyde condensate.

Thereafter, the pH of the reaction mixture is made alkaline to a pH of from between 7.0 and about 9 and preferably between 7.5 and 8.5 and the resin mixture is clarified as though a pressure-type filter or the like. Thereafter, the resin may be concentrated under vacuum to an oven solids content of from between 85 and 90% and it will remain stable against turbidity and hydrophobing, as defined hereinabove.

The resin mixture of the present invention may be used on textile fabrics and particularly on nylon netting and when so used is found to safely meet the standards described in the Flammable Fabrics Act (P. A. 88—83rd Congress) whereas similar pieces of nylon netting when treated with conventional thermosetting textile resins, is classifiable as a fabric subject to rapid and intense burning.

While the resin of the present invention is effective for imparting flame resistant characteristics to textile fabric, when used on nylon netting it does not impart a stiff, springy hand which is highly desirable for such items of apparel as petticoats and ladies' evening wear. Thus, the resin of the present invention when employed on nylon is preferably blended with resins and/or other materials such as starch and starch derivatives which impart stiffness to the nylon. In this connection, the resin of the present invention is preferably employed with aminoplast resins and in particular with a water-dispersible or water-soluble methylated or unmethylated partially polymerized urea-formaldehyde resin in ratios of from 1:1 to 1:5, respectively, though lower and higher ratios may be employed, depending upon the desired hand and necessary flame resistant characteristics. Other suitable aminoplast resins, however, may be employed with the resin of the present invention, as for example, melamine-formaldehyde reaction products, guanamine-formaldehyde reaction products, ethylene urea and its homologues and their formaldehyde reaction products and the like, either singly or in combination with one another.

While the above-disclosed method of preparing the resin of the present invention represents a preferred procedure, it will be noted that the resinous product of the present invention may be produced by a number of different procedures. For example, the urea and thiourea may be methylolated independently, and then subsequently mixed before alkylation, or they may be methylolated independently, alkylated independently, and then mixed.

Regardless of how the mixed resin of the present invention is made, the combined formaldehyde should be from between about .5 to a theoretical maximum of 2 moles per mole of urea and thiourea in the final reaction product. Preferably, the moles of combined formaldehyde should be from between about 0.8 to 1.7 moles per mole of urea-thiourea taken together.

The degree of alkylation is limited in that one can only alkylate on a mole basis the moles of methylol groups on the urea and thiourea. According to the present invention, a minimum amount of about .10 mole of combined alcohol per mole of combined formaldehyde as —$CH_2OH$ groups results in an acceptable product, but from about .25 to about .60 mole is preferred.

The percent of combined formaldehyde is taken as the difference between percent total formaldehyde and percent free formaldehyde. The free formaldehyde content is determined by the conventional sulfite method in the presence of a known amount of acid, and back titrating with caustic solution. The total formaldehyde figure is determined by a special method developed for use in resins in which sulfur is present. This method consists of hydrolyzing the resin with phosphoric acid in the presence of mercuric oxide, the latter being used to prevent interference of the sulfur with the reaction. The methanol and formaldehyde are distilled off into water and total formaldehyde is determined by the standard alkaline peroxide method.

The percent of combined alcohol may be determined by any one of a number of conventional processes. With regard to methanol, the percent of combined methanol is taken as the difference between the percent total methanol and the percent of free methanol. The total methanol figure is obtained by dichromate oxidation of the aforementioned distillate and back titrating with thiosulfate, correcting for the formaldehyde which is also oxidized under these conditions. Free methanol is determined by a special method in which the free methanol is esterified with a known excess of phthalic anhydride in the presence of pyridine. The unreacted phthalic anhydride is then converted to phthalic acid and the free methanol content is calculated by determining the amount of ester formed. The thiourea content is obtained by oxidizing the sulfur in a Parr bomb followed by its conversion to barium sulfate. The urea content is obtained by the standard Kjeldahl nitrogen method and correcting for the nitrogen present in thiourea.

Resins produced according to the preferred above-disclosed process are capable of imparting improved flame retardant finishes to textile fabrics and in particular to nylon nettings, such as Rachelle nylon netting, and may be applied as by spraying, padding, dipping, or other suitable means. As noted above, the resin of the present invention is preferably employed with polymerized methylolated urea resins and polymerized methylated methylol urea resins, in amounts of from 1:1 to 1:5, respectively.

As pad bath compositions, the resin of the present invention may be present in amounts of from between about 8 and 25% resin solids and a preferred range of between 10% and 15% resin solids. Urea-formaldehyde resins of the type preferred are employed to impart a stiff springy hand to nylon mesh netting in amounts of from between 30% and about 50% resin solids and preferably from between about 35 and 40% resin solids. Thus, the pad bath compositions employing the resins of the present invention would contain from between about 38% and about 75% resin solids and preferably from between 40 and 65% resin solids.

After being padded on, the fabric is preferably dried and the resins of the present invention either alone or in admixture with stiffening agents are cured for from ½ minute to 3 minutes at from 350° F. to 280° F. and preferably for from ¾ of a minute to 1¼ minutes at from 325° F. to 300° F. in the presence of a curing catalyst such as ammonium chloride, ammonium bromide, and the like. The acid catalyst may be present in amounts of from between 0.2% and 1.2% and higher but is preferably present in amounts of from between 0.4% and 0.8% based on the weight of resin solids.

In order that the present invention may be more fully understood, the following examples are given primarily by way of illustration. No details therein should be construed as limitations on the present invention, except as they appear in the appended claims. All parts and percentages are by weight unless otherwise designated.

Example 1

Into a suitable reaction vessel equipped with a reflux condenser, glass stirrer and thermometer were charged 540 parts (16.8 moles) of methanol, 8 parts of 50% triethanolamine (sufficient to adjust the pH to 9) 608 parts (8.0 moles) of thiourea, and 318 parts (9.6 moles) of paraformaldehyde. The mixture was heated to 50° C. over a 30-minute period and was held at from between 50 and 55° C. for approximately 2 hours. At this time, the pH was adjusted to 5.3 with formic acid solution and heating was continued for an additional hour at 50–55° C. Ninety-six parts (1.6 moles) of urea were then added and the pH was determined to be 5.5. Stirring the reaction mixture at a temperature between 50 and 55° C. was continued for an additional hour. Thereafter, caustic soda solution was added in an amount sufficient to adjust the pH to 7:5 and 8. After being cooled to 30° C., the batch was clarified through a pressure filter and then concentrated under vacuum, from about 63% solids to about 90% solids.

Samples of the urea-modified thiourea-formaldehyde syrup reaction product produced as described above were stored at temperatures of 12° C., 25° C. and 37° C., respectively. They were observed periodically for any signs of turbidity or crystalline precipitate. The stabilities of this highly concentrated resin at these temperatures were as follows: 37° C.—4 weeks; 25° C.—2 months; 12° C.— 2½ to 3 months.

When a sample was diluted with three times its volume of water at 25° C., it did not hydrophobe.

A chemical analysis of the resin prepared as described above was as follows:

|  | Percent Found | 1 Mole Basis |
|---|---|---|
| Thiourea | 51.0 | 1.00 |
| Urea | 10.1 | 0.25 |
| Total Methanol | 11.0 | .514 |
| Free Methanol | 4.3 | .200 |
| Combined Methanol | 6.7 | .314 |
| Total Formaldehyde | 23.6 | 1.17 |
| Free Formaldehyde | 2.3 | .11 |
| Combined Formaldehyde | 21.3 | 1.06 |

Example 2

30 denier, 2-ply nylon Rachelle net was padded through a concentrated pad bath containing 0.5 part of ammonium bromide dissolved in 31.5 parts of water, 17 parts of the resin syrup produced according to Example 1 and 51 parts of a thermosetting syrup containing 85% partially polymerzed dimethylol urea. The squeeze rolls of the padder were adjusted for a 100% wet pick-up. Thereafter, the treated fabric was put on a 10-inch pin frame using tension and placed in an oven maintained at 310° F. for 1 minute. The treated net had a desirable stiff and resilient finish and is found to safely meet the standards described in the Flammable Fabrics Act (P. L. 88—83rd Congress) both initially and after being laundered, whereas the original nylon net, after being impregnated with an equivalent quantity of a resin consisting of urea-formaldehyde alone is classifiable as a fabric subject to rapid and intense burning.

Example 3

Example 1 was repeated using oxalic acid to reduce the pH to 4.9. The resultant concentrated resin set up to a white opaque semi solid on standing overnight at 25° C. A chemical analysis of the resin produced by this example is as follows:

|  | Percent Found | 1 Mole Basis |
|---|---|---|
| Thiourea | 52.6 | 1.00 |
| Urea | 8.8 | 0.21 |
| Total Methanol | 16.4 | 0.74 |
| Free Methanol | 1.6 | 0.07 |
| Combined Methanol | 14.8 | 0.67 |
| Total Formaldehyde | 23.7 | 1.15 |
| Free Formaldehyde | 1.0 | 0.05 |
| Combined Formaldehyde | 22.7 | 1.10 |

It will be noted that a principal difference in the anlysis between the resin produced in Example 3 and that produced in Example 1 is the combined alcohol content. In the present example, the combined alcohol on a mole basis is .67. This is sufficient to render the final product unstable. The amount of combined alcohol is to some extent controlled by the acid pH. Thus, it will be observed that under the reaction conditions of the present invention a pH of 4.9 results in an unacceptable product when the resin is highly concentrated.

Example 4

Example 1 was repeated except that only 8.4 moles of methanol were used instead of the 16.8 moles referred to therein. In addition, the resin was not concentrated to from between 85 and 90% but was allowed to remain concentrated to 63%. The stability date for the resin produced according to this example was slightly decreased when compared with the stability of the product of Example 1, when stored at temperatures of 37° C., 25° C. and 12° C., respectively.

Example 5

Example 4 was repeated except that the mole ratio of formaldehyde to thiourea was 2.1 to 1. Stability of the resultant mixed resin was similar to that of the resin of Example 1.

Example 6

The concentrated resinous product made in Example 1 was diluted with water to give products of from between 50 and 65% solids.

Samples of these resinous products were stored at temperatures of 12° C., 25° C. and 37° C., respectively. They were observed periodically for any signs of turbidity or crystalline precipitate. Stabilities at these temperatures in day units were as follows:

Storage conditions:     Storage times, days
   Stored at 37° C _____ 25 to 30
   Stored at 25° C _____ 45 to 60
   Stored at 12° C _____ 150

It will thus be seen that storage stability is substantially the same for the resin of the present invention, whether concentrated to 50 to 65% solids or to about 90% solids, except when stored at 12° C. At this lower temperature, the less concentrated resin syrup is distinctly more stable.

*Example 7*

A resin produced according to the process of Example 1 was diluted with water to a solids content of between 40 and 50%. Solvitose HDF, a starch ether, was dissolved in amounts of from between about 3 and 9% based on the total weight of the resin solids. Stability data obtained on the mixtures was of the same order as that reported in Example 1. On a solids basis, equal amounts of this resin mixture gave equal flame retardancy as the resinous product of Example 1. The stiffness of the hand was improved so that at least 20% of the urea-formaldehyde syrup added as a stiffening agent in the resin mixture reported in Example 2 in the bath could be eliminated with no loss of stiffness over that produced in said Example 2.

The products of the present invention, in addition to being useful as textile resins, are useful in fields wherein water-soluble thiourea and urea-formaldehyde condensates are employed, such as the paper making industry and the like.

We claim:

1. A process for preparing a hydrophilic potentially thermosetting resinous product which comprises reacting at a temperature above 45° C. and at a pH between 7 and 10 relative proportions of 1 mole of thiourea with between 1.0 and 2.2 moles of formaldehye in the presence of between 1.0 and 5.0 moles of a saturated monohydric aliphatic alcohol containing 1 to 3 carbon atoms, adjusting the pH of the reaction mixture to between about 5.1 and about 6.0 and reacting said mixture, adding from between 0.05 and 0.38 mole of urea to said reaction mixture, and reacting the mixture, and thereafter adjusting the pH to between 7 and 9 to produce a stable resinous product, said stable resinous product being one which does not become turbid when maintained for four weeks at 25° C. and which does not hydrophobe when diluted with 3 times its volume of water at 25° C.

2. A process for preparing a hydrophilic potentially thermosetting resinous product which comprises reacting at a temperature between 45° C. and 65° C. and at a pH between 7 and 10 relative proportions of 1 mole of thiourea with between 1.0 and 2.2 moles of formaldehyde in the presence of between 1.0 and 5.0 moles of a saturated monohydric aliphatic alcohol containing 1 to 3 carbon atoms, adjusting the pH of the reaction mixture to between 5.3 and 5.7 and reacting said mixture at a temperature between 45° C. and 65° C., adding from between 0.10 and 0.30 mole of urea to said reaction mixture and reacting the mixture, and thereafter adjusting the pH to between 7 and 9 to produce a stable resinous product, said stable resinous product being one which does not become turbid when maintained for four weeks at 25° C. and which does not hydrophobe when diluted with 3 times its volume of water at 25° C.

3. A process for preparing a hydrophilic potentially thermosetting resinous product which comprises reacting at a temperature between 50 and 55° C., and at a pH between 7.5 and 9.0 relative proportions of 1 mole of thiourea with between 1.2 and 1.6 moles of formaldehyde in the presence of between 1.0 and 2.5 moles of a saturated monohydric aliphatic alcohol containing 1 to 3 carbon atoms, adjusting the pH of the reaction mixture to between 5.3 and 5.7 and reacting said mixture, adding from between 0.1 and 0.30 mole of urea to said reaction mixture and reacting the mixture, and thereafter adjusting the pH to between 7.5 and 8.5 to produce a stable resinous product, said stable resinous product being one which does not become turbid when maintained for four weeks at 25° C. and which does not hydrophobe when diluted with 3 times its volume of water at 25° C.

4. A process for preparing a hydrophilic potentially thermosetting resinous product which comprises reacting for from 1½ to 2½ hours at a temperature between 50 and 55° C. and at a pH between 7.5 and 9.0 relative proportions of 1 mole of thiourea with between 1.2 and 1.6 moles of formaldehyde in the presence of between 1.0 and 2.5 moles of a saturated aliphatic monohydric alcohol containing 1 to 3 carbon atoms, adjusting the pH of the reaction mixture to between 5.3 and 5.7 and reacting said mixture for from between 30 minutes and 90 minutes, adding from between 0.1 and 0.30 mole of urea to said reaction mixture and reacting the mixture for from between 30 minutes and 90 minutes and thereafter adjusting the pH to between 7.5 and 8.5 to produce a stable resinous product, said stable resinous product being one which does not become turbid when maintained for four weeks at 25° C. and which does not hydrophobe when diluted with 3 times its volume of water at 25° C.

5. A process according to claim 4 wherein the aliphatic alcohol is methanol.

6. A process according to claim 4 wherein the aliphatic alcohol is ethanol.

7. A process according to claim 4 wherein the aliphatic alcohol is propyl alcohol.

8. A hydrophilic potentially thermosetting resin produced according to the process of claim 1.

9. A hydrophilic potentially thermosetting resin produced according to the process of claim 5.

10. A process for treating nylon-containing textile fabric comprising treating said fabric with a resin composition comprising from between 8% and 25% resin solids produced according to claim 1, and thereafter curing said resin to a water-insoluble state in the presence of an acid catalyst.

11. A process for treating nylon-containing textile fabric comprising treating said fabric with a resin composition comprising from between 8% and 25% resin solids produced according to claim 1 and from between 30% and 50% resin solids of a different hydrophilic water-soluble aminoplast resin, and thereafter curing said resin for from 75 seconds at 300° F. to 45 seconds at 325° F. to a water-insoluble state in the presence of from between 0.2% and 1.2% acid catalyst, based on the weight of resin solids.

12. A process for treating nylon fabric comprising treating said fabric with a resin composition comprising from between 10 and 15% resin solids produced according to claim 1 and from between 35% and 40% resin solids of a hydrophilic water-soluble urea derivative of the group consisting of the monomers and lower polymers of methylol urea and lower alkyl ethers of methylol urea, and thereafter curing said resin from 75 seconds at 300° F. to 45 seconds at 325° F. to a water-insoluble state in the presence of from between 0.4% to 0.8% acid catalyst, based on the weight of resin solids.

References Cited in the file of this patent

UNITED STATES PATENTS

| | | |
|---|---|---|
| 2,329,651 | Powers et al. | Sept. 14, 1943 |
| 2,750,356 | Hurwitz | June 12, 1956 |